United States Patent
Dewes

(10) Patent No.: US 9,005,438 B2
(45) Date of Patent: Apr. 14, 2015

(54) DEVICE FOR A FUEL FILTER SYSTEM

(75) Inventor: Markus Dewes, Oberthal (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 694 days.

(21) Appl. No.: 13/138,382

(22) PCT Filed: Jan. 15, 2010

(86) PCT No.: PCT/EP2010/000179
§ 371 (c)(1),
(2), (4) Date: Aug. 8, 2011

(87) PCT Pub. No.: WO2010/091767
PCT Pub. Date: Aug. 19, 2010

(65) Prior Publication Data
US 2011/0284448 A1    Nov. 24, 2011

(30) Foreign Application Priority Data
Feb. 12, 2009    (DE) .......................... 10 2009 008 676

(51) Int. Cl.
| | | |
|---|---|---|
| B01D 17/05 | (2006.01) | |
| B01D 35/00 | (2006.01) | |
| F02M 37/22 | (2006.01) | |
| B01D 17/04 | (2006.01) | |
| B01D 17/06 | (2006.01) | |
| B01D 17/00 | (2006.01) | |
| B01D 35/18 | (2006.01) | |
| B01D 36/00 | (2006.01) | |
| F02M 27/04 | (2006.01) | |

(52) U.S. Cl.
CPC ............ *B01D 17/048* (2013.01); *B01D 17/047* (2013.01); *B01D 17/06* (2013.01); *B01D 17/08* (2013.01); *B01D 35/185* (2013.01); *B01D 36/006* (2013.01); *F02M 27/04* (2013.01); *F02M 37/221* (2013.01); *B01D 2201/295* (2013.01); *B01D 2201/34* (2013.01)

(58) Field of Classification Search
CPC .. B01D 17/045; B01D 17/047; B01D 17/048; B01D 17/06; B01D 17/08; B01D 35/00; B01D 2201/295; B01D 2201/34; F02M 27/04; F02M 37/221; C02F 1/681; C02F 1/687; C02F 1/688
USPC ................................ 210/206, 416.4
See application file for complete search history.

(56) References Cited

U.S. PATENT DOCUMENTS

| | | |
|---|---|---|
| 3,165,470 A | 1/1965 | Giesse et al. |
| 4,988,427 A | 1/1991 | Wright |
| 5,108,618 A | 4/1992 | Hirasawa |
| 5,149,354 A * | 9/1992 | Delaney ..................... 504/121 |
| 2009/0007970 A1 * | 1/2009 | Lin .............................. 137/268 |

FOREIGN PATENT DOCUMENTS

| | | |
|---|---|---|
| DE | 195 06 857 | 8/1996 |
| DE | 195 09 367 | 9/1996 |
| DE | 10 2005 005 848 | 8/2006 |
| DE | 10 2006 054 167 | 5/2007 |

(Continued)

*Primary Examiner* — Lucas Stelling
(74) *Attorney, Agent, or Firm* — Roylance, Abrams, Berdo and Goodman LLP

(57) ABSTRACT

A device (8) for a fuel filter system (10, 14) separates water from the fuel. The water takes on a property enhancing the separation by the device (8) by the action of a medium (42).

9 Claims, 3 Drawing Sheets

(56) References Cited

FOREIGN PATENT DOCUMENTS

| | | |
|---|---|---|
| DE | 10 2007 047 895 | 7/2008 |
| EP | 0 317 816 | 5/1989 |
| EP | 1 726 818 | 11/2006 |
| GB | 1128758 | 10/1968 |

* cited by examiner

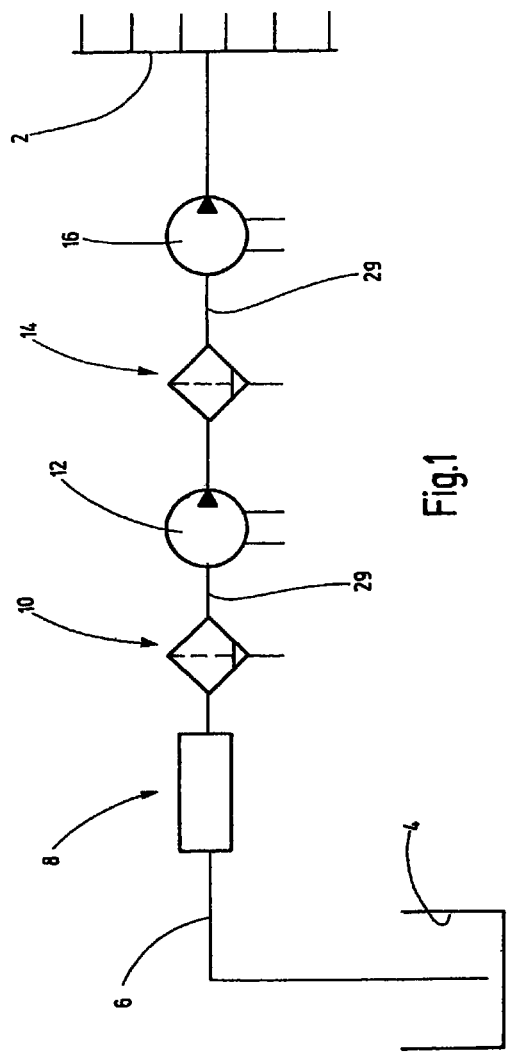

DEVICE FOR A FUEL FILTER SYSTEM

FIELD OF THE INVENTION

The invention relates to a device for a fuel filter system that separates water from the fuel.

BACKGROUND OF THE INVENTION

Fuel filter systems for supplying drives of a variety of kinds are configured, according to the prior art, in such a way that not only the contaminants, like suspended particles, dust, and the like, are removed, but that water is also removed. Such filter systems are used especially in diesel engines for the purpose of protecting the injection systems. EP 1 669 590 A1 discloses, for example, a filter system that provides a water separation in the course of supplying fuel to motor vehicles.

High efficiency of the water separation is important for the safe and reliable operation of the systems to be supplied by a respective fuel system.

SUMMARY OF THE INVENTION

An object of the invention is to provide a device for a fuel filter system that guarantees an especially effective separation of the water contained in fuels, in particular, diesel fuels.

The invention basically achieves this object with a device causing the properties of the water to change through the use of a medium to the effect that the associated filter system improves the separation of water. This strategy offers the possibility of achieving maximum separation of the water from the "pre-treated" fuel with the conventional designs of filter systems that are arranged downstream of the device according to the invention.

Especially advantageously, the volume of water droplets increases subject to the action of the medium.

In principle, the water separation can be enhanced in that the medium to be used influences, as the precursor to the separation process taking place in the downstream filter system, the coalescing properties in a suitable way.

To enhance the coalescence, the water can undergo a polarization and/or ionization subject to the action of the medium.

The coalescence enhancing medium can be synthesized on the basis of salt in an especially advantageous way. The resulting effects produced in the fuel cause the water to collect so as to form larger conglomerates. The use of sodium chloride (NaCl) has proven to be especially advantageous.

Advantageously, the device can have at least one housing for accommodating a fill amount of the salt, with which the fuel flowing into the filter system can make contact in the housing.

In this case, the housing can be inserted in an especially advantageous way into the fuel line extending to the filter system and can have a fuel inlet and a fuel outlet as well as an insert comprising the salt filling. This insert, through which the fuel can flow, is located between said fuel inlet and said fuel outlet.

For this purpose, especially preferred, the insert containing the salt filling has the form of a cartridge that is disposed in a replaceable manner in the housing and is configured in such a way that it fills in a substantially fitting manner the housing between the inlet and the outlet. As a result, all of the fuel flow passing through the fuel line, flows through the salt filling.

Especially preferred, the cartridge forms a partial casing of the salt filling.

That design of the cartridge is especially advantageous when it contains salt in the loose state.

As an alternative, the cartridge can be formed by a stick containing salt in the solid state.

Preferably, a screen is provided to prevent the uncontrolled leakage of salt, at least at the outlet of the housing.

Especially advantageously, this screen at one end of the casing of the cartridge so that when the cartridge is replaced, the respective screen can also be replaced at the same time.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a simplified function diagram of a fuel filter system intended for supplying fuel to a diesel engine and provided with a device according to an exemplary embodiment of the invention;

DETAILED DESCRIPTION OF THE INVENTION

Figure 3:
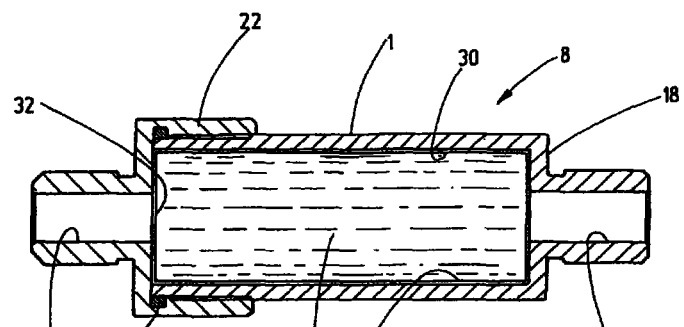
FIG. 3 is a side elevational view in section of the device of FIG. 2.

FIG. 1 is an overview of a fuel filter system for supplying a diesel engine 2 with diesel fuel from a fuel tank 4 by way of a fuel line 6. Line 6 runs to an inventive device 8 of the exemplary embodiment to be described herein. The device is depicted in greater detail in FIGS. 2 to 4. The fuel line extends from the device 8 to a first water separating filter system 10 and from there by way of a fuel pump 12 to a second water separating filter system 14. From system 14, the cleaned, water-free fuel is delivered to the motor 2 by an injection pump 16. The filter system 10 serving as the prefilter and the filter system 14 serving as the main filter are shown in greater detail in FIG. 5. Instead of two water separating filter systems 10 and 14, just the prefilter 10 or just the main filter 14 can be provided for the water separating. The device 8 could also be disposed at any point inside the fuel line or the return line.

Figure 4:
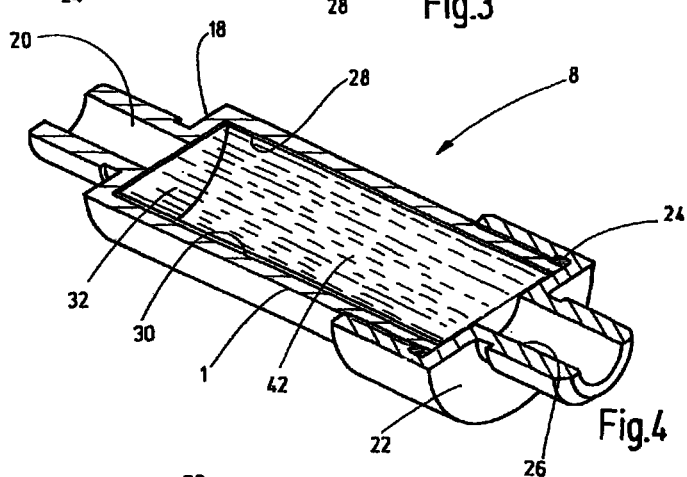
FIG. 4 is a perspective view in section of the device of FIG. 2.
Figure 2:
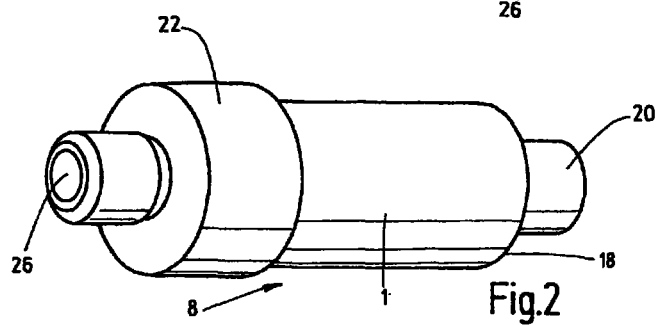
FIG. 2 is a perspective view of the exemplary embodiment of the device drawn approximately to the natural size of a practical embodiment.

According to FIGS. 2 to 4, the device 8 has a housing 1 in the shape of a circular, cylindrical sleeve that is closed at one end 18 with the exception of a centrally located fuel outlet 20. At the opposite end, the main part of the housing is closed by a screwed on closing cap 22. A seal is provided with an O-ring 24 at closing cap 22. The cap 22 has a centrally located fuel inlet 26.

When the cap 22 is unscrewed, the interior space of the main part of the housing is accessible to put in an insert in the form of a salt cartridge 28. In the housing 1, cartridge 28 forms a salt filling 42, in the example, sodium chloride. Especially when the salt filling 42 has loose salt, the cartridge 28 has preferably a casing 30. The shape of the cartridge 28 is adapted to the circular cylindrical interior space of the housing 1 such that the result is a substantially abutting fit with the inner walls. The entire stream of fuel then makes contact with or flows through the salt filling 42. To prevent the salt from escaping when the fuel flows through, a screen 32 is arranged upstream of the fuel outlet 20. This screen may be a part of the casing 30 or may be mounted on the end cap 22. When the screen 32 is located on the casing 30, this screen is replaced at the same time that the salt cartridge 28 is replaced. A suitable fineness of the screen 32 lies in a range of aperture diameters of 25 μm.

Instead of using loose salt inside a casing 30, the cartridge 28 can be formed by a solid block of salt or a partially plasticized stick. After the fuel has made contact with the salt filling 42, the fuel is conditioned by the effect of the coalescing property such that a significantly improved water separation is guaranteed in the respective fuel filter system 10, 14, arranged downstream of the device 8.

Figure 5:
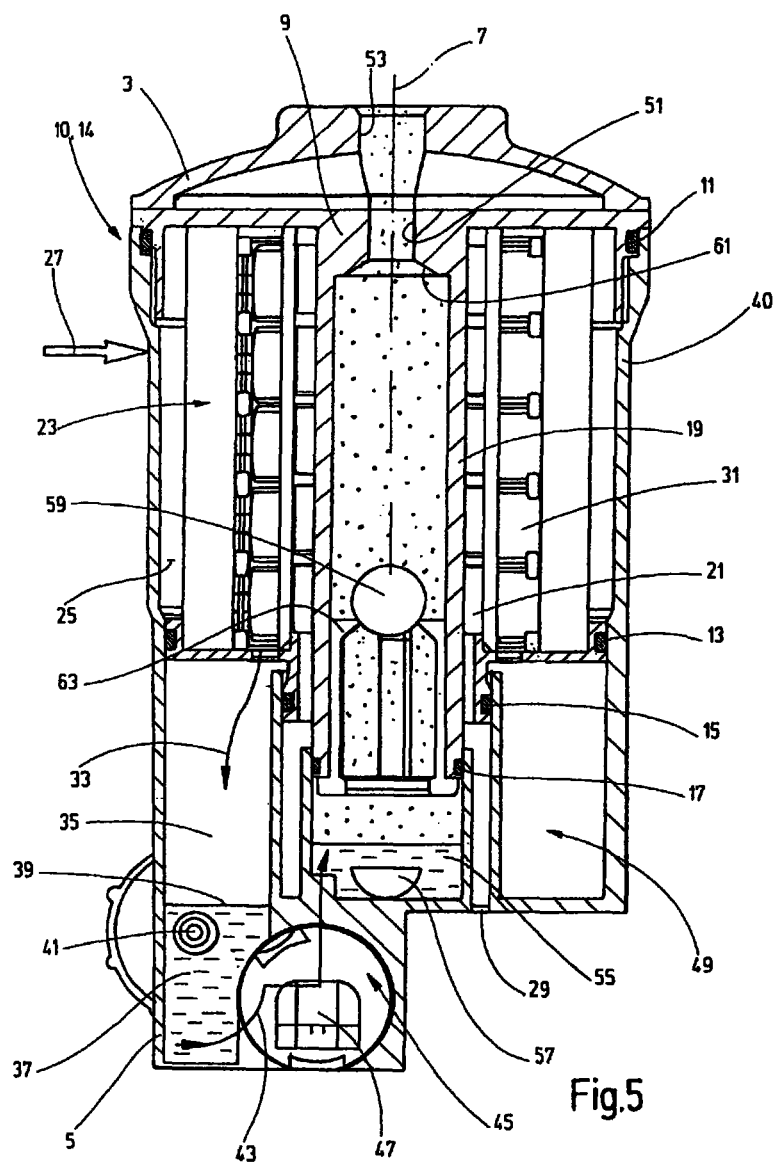
FIG. 5 is a simplified, schematic side elevational view in section of a fuel filter system, to which the device according to the invention is assigned.

A suitable design of the filter system, arranged downstream of the device 8, is shown in detail in FIG. 5. According to the drawing in FIG. 1, a first filter system 10 is provided as the prefilter and a second filter system 14 is provided as the main filter.

FIG. 5 shows an exemplary embodiment with a filter housing 40. The upper side of filter housing 40 is closed tightly with a removable closing cover 3. The housing 40 has, with the exception of a bottom part 5, an essentially circular cylindrical shape with a central vertical axis 7. A coaxial inner body 9 is inserted into the housing 1, starting from the upper side of the housing 1 that is open when the cover 3 is removed. The coaxial inner body is sealed off from the housing walls by sealing arrangements 11, 13, 15, and 17. The inner body 9 forms with its coaxial inner tube 19 an evaporator housing, the details of which will be discussed below.

The outside of the inner tube 19 is adjacent to the clean side 21 of a concentric fuel filter device 23 that is mounted on the inner body 9. As shown simply by the flow arrow 27, the diesel oil is fed through a fuel inlet (not shown) to the dirty side 25 of the fuel filter system. After flowing through the filter device 23 from the outside to the inside, the diesel oil passes out of the clean side 21 to a bottom side fuel outlet 29.

The filter device 23 is constructed conventionally such that the water is separated in the separating zone 31. As indicated by the arrow 33, the separated water passes together with the diesel oil into a collection chamber 35 formed by the bottom housing section adjacent to the bottom part 5. Due to the specific weight of the water being higher than that of the diesel oil, in operation a bottom side sump 37 of the separated water is formed in the collection chamber 35. The upper separating line between the separated water and the lighter diesel oil lying thereon is designated as reference numeral 39. The level height of the separating line 39 between the sump 37 of the separated water and the diesel oil lying thereon is detected by a water level sensor 41.

As indicated with the flow arrow 43, a dispensing device 45 is attached to the bottom of the sump 37. The operation of the dispensing device can be controlled as a function of the signals of the water level sensor 41. In the present embodiment, the fuel pump is disposed downstream of the fuel outlet 29. In operation, a negative pressure then prevails in the filter housing 40. The dispensing device 45 has a pump 47. The operation of the pump is controlled by the water level sensor 41 such that in operation so much water of the sump 23 is drained from the collection chamber 35 that the separating line 39 does not fall to the connecting point on the dispensing device 45. The pump 47 then conveys the separated water into a water receiving and evaporator device 49.

The inner tube 19 of the inner body 9 forms, as part of the water receiving and evaporator device 49, an evaporator housing, extending upstream of the dispensing device 45 coaxially upward to an evaporating water outlet 51. An evaporating water outlet 53 in the cover element 3 is attached to water outlet 51.

To control the evaporation of the water 55, conveyed through the pump 47 into the evaporator housing 19, the base of the evaporator housing has an element 57 for controlled heat dissipation. In this case, a separate heating device or a heat exchanger for the supply of engine heat, exhaust gas heat, or coolant heat can be provided.

Especially advantageously, a PTC element, that is, a resistance element with a positive curve of the temperature coefficient, can be used to dispense with the regulating and control devices or a thermal cutoff fuse.

The water 55, delivered by the pump 47 and pre-cleaned by a gravity induced layer separation process in the collection chamber 35, evaporates to form water vapor or fog. The vapor or fog rises, as indicated in FIG. 5, in the inner tube 19 and passes to the outside through the evaporating water outlet 51 of the inner tube 19 and the evaporating water outlet 53 in the cover element 3.

As stated above, the water receiving and evaporator device 49 includes a safety device in the form of a valve arrangement that closes as a function of an inadmissible quantity of non-evaporated, collected water 55. For this purpose, the present embodiment provides a float valve, having, as the closing body, a float ball 49. Float ball 49 interacts with a valve seat area 61 on the evaporating water outlet 51 and closes the outlet by floating upward and resting against the valve seat area 61. In the instance that the amount of fluid controlled by the operation of the pump 47 is normal in the evaporator housing, the float ball 59 is located, as shown in FIG. 5, at a distance from the valve seat surface 61, where the ball 59 rests on holding ribs 63.

While one embodiment has been chosen to illustrate the invention, it will be understood by those skilled in the art that various changes and modifications can be made therein without departing from the scope of the invention as defined in the appended claims.

What is claimed is:

1. A device for a fuel filtering system that separates water from fuel, comprising:
    a housing having a fuel flow inlet, a fuel flow outlet and an interior space in fluid communication with said inlet and said outlet, said housing being inserted in a fuel line connected to a filter system; and
    a block of salt essentially completely filling said interior space as an insert and as a replaceable cartridge, the fuel contacting said block of salt between said inlet and said outlet upstream of said filter system, said block of salt contacting and interacting with the water in the fuel in said housing as the fuel flows through said housing in the fuel filtering system to promote separation of the water from the fuel.

2. A device according to claim 1 wherein
    said block of salt increases volumes of water droplets in the fuel.

3. A device according to claim 2 wherein
    said block of salt polarizes the water droplets.

4. A device according to claim 2 wherein
    said block of salt ionizes the water droplets.

5. A device according to claim 1 wherein
    said salt contains sodium chloride.

6. A device according to claim 1 wherein
    said cartridge forms a partial casing.

7. A device according to claim 1 wherein
    said cartridge comprises a stick of salt in a solid state.

8. A device according to claim 1 wherein a screen is located in said housing at said outlet to prevent uncontrolled leakage of salt from said housing.

9. A device according to claim 8 wherein said screen is at one end of a casing of said cartridge.

* * * * *